UNITED STATES PATENT OFFICE.

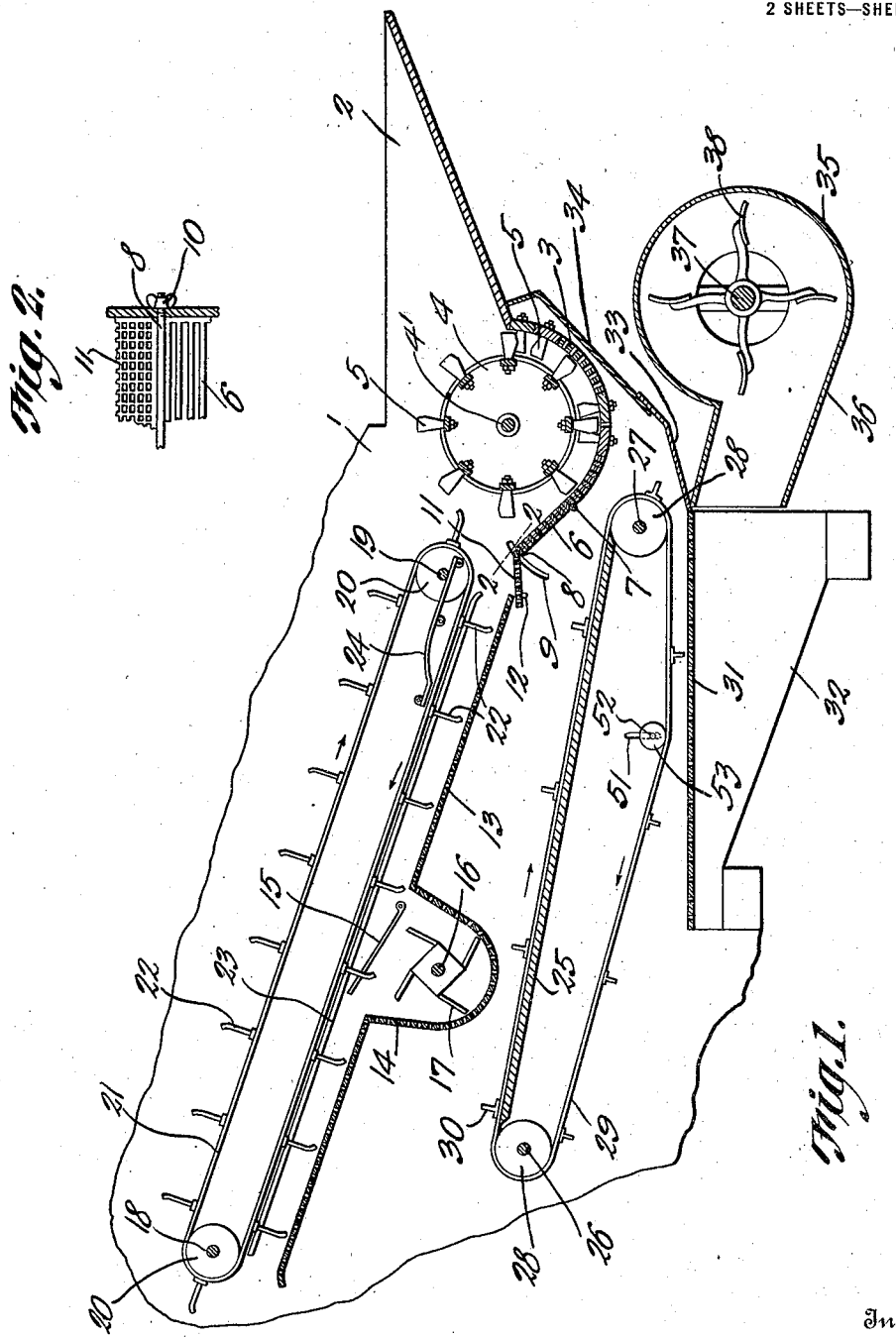

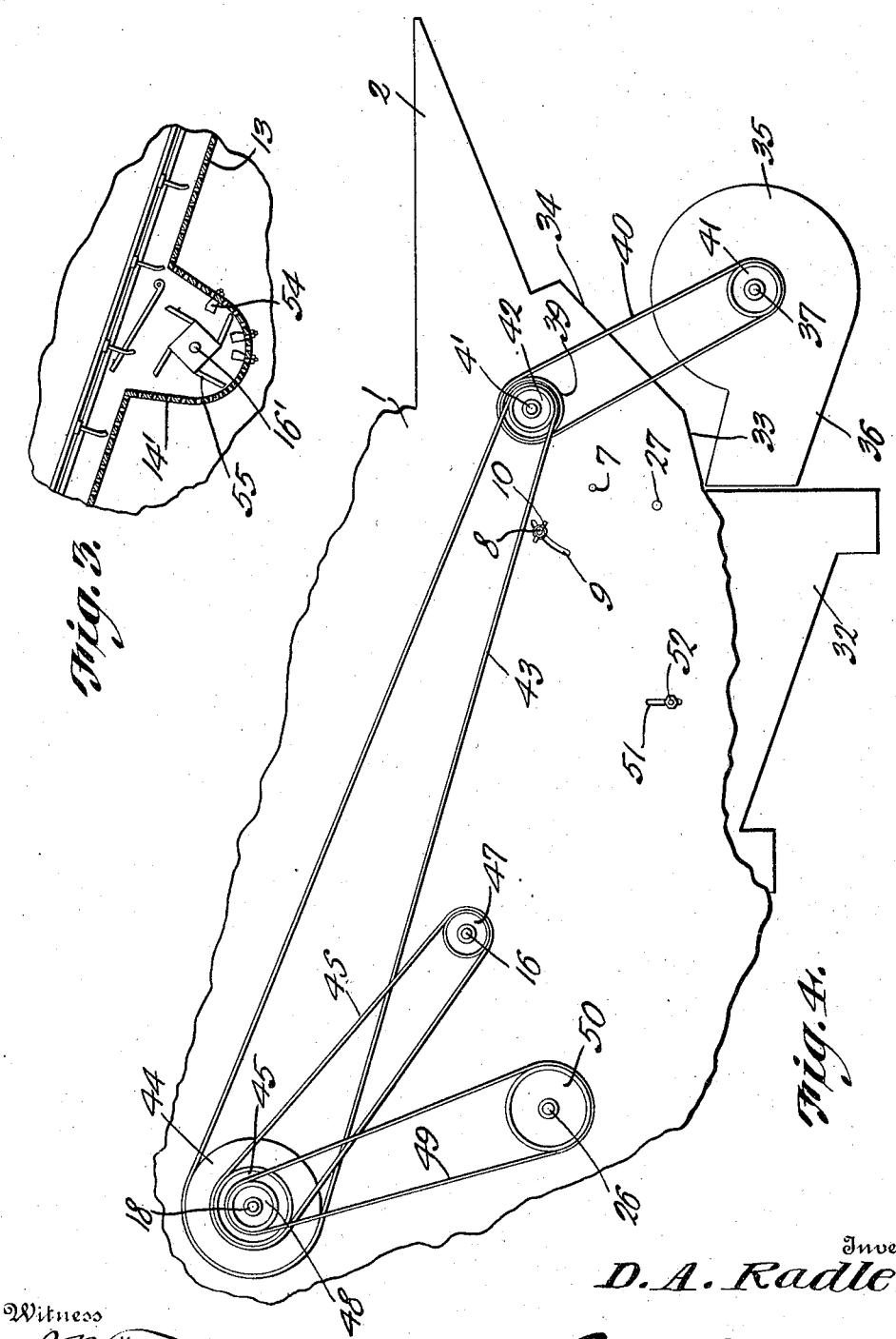

DON A. RADLE, OF OKLAHOMA, OKLAHOMA.

GRAIN-SEPARATOR.

1,235,596.   Specification of Letters Patent.   Patented Aug. 7, 1917.

Application filed March 16, 1917. Serial No. 155,278.

*To all whom it may concern:*

Be it known that I, DON A. RADLE, a citizen of the United States, residing at Oklahoma city, in the county of Oklahoma and State of Oklahoma, have invented a new and useful Grain-Separator, of which the following is a specification.

This invention relates to grain separators, one of its objects being to provide improved means whereby a supplemental threshing or beating action upon the grain takes place after the grain leaves the threshing cylinder and concave, thus to prevent practically all loss of grain, the supplemental beating or threshing mechanism requiring little if any additional power and being located out of the path of travel of the bulk of straw being conveyed through the separating mechanism.

A further object is to provide means whereby heavy damp material may be properly cleaned without choking the machine.

Another object is to provide separating mechanism operating to give a steady and continuous flow of straw at all times so that choking of the machine at points of separation cannot take place.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a vertical longitudinal section through the separating mechanism constituting the present invention.

Fig. 2 is an enlarged section on line 2—2 Fig. 1, said section being taken through one side of the machine.

Fig. 3 is a vertical longitudinal section through a portion of a modified form of machine.

Fig. 4 is a side elevation of a portion of the machine and showing the driving mechanism.

Referring to the figures by characters of reference 1 designates a portion of the body of the machine at one end of which is arranged a feed hopper 2 discharging downwardly into a concave 3 which is below and concentric with a threshing cylinder 4, it being understood that the concave and cylinder are provided with teeth 5 as ordinarily.

The discharge end of the concave is formed with an angularly adjustable grate section 6 pivotally mounted as at 7 and having a transverse rod 8 at its rear end which extends through arcuate slots 9 in the sides of the body 1. Any suitable means such as wing nuts 10 can be used for fastening the rod at any desired points in the slots after the grate section 6 has been adjusted to a predetermined angle. A screen 11 may be hingedly mounted on the rod 8, this screen being loosely supported by cross rods 12. Said screen is extended under the lower end portion of an inclined screen 13 extending longitudinally of the machine. By providing the movable grate section 6 of the concave, said section can be lowered so as to prevent straw and vines from being lashed or pulled back over the cylinder 4. In fact, said section 6 can be adjusted to any desired angle to produce the best possible results. Under all conditions the screen 11, which constitutes an extension of the concave section 6 will project under and close to the lower or front end of the screen 13 and insure the passage of material from the grate to the screen 13.

At a point between its ends the screen 13 is intersected by a transverse depression or gutter 14 formed preferably of the same material as the screen 13. This gutter is bridged by rearwardly and upwardly inclined fingers 15. A transverse shaft 16 extends longitudinally of the gutter and has beater arms 17 secured thereto.

Transverse shafts 18 and 19 are journaled in the structure 1 above the respective ends of the screen 13 and support sprockets 20 or the like on which are mounted endless belts 21 having outstanding rake teeth 22. The lower flight of the carrier thus formed is supported by guide cleats 23 and the teeth of the lower flight are adapted to work longitudinally of and close to the screen 13 and to pass between the fingers 15. A deflector 24 is arranged between the lower portions of the upper and lower flight and extends between the lower wheels 20 on shaft 18, this deflector preventing straw and the like from working upwardly between the flights where it passes between the screen 13 and the shaft 19.

Arranged under the screen 13 and the gutter 14 is an imperforate table 25 and adjacent the ends of which are journaled transverse shafts 26 and 27 respectively carrying sprockets or other wheels 28 engaging endless belts 29 on which are arranged cleats 30, or the like. The conveyer thus produced is adapted to travel in the direction indicated by the arrow in Fig. 1.

The lower flight of the conveyer 29 is extended close to the cleaning screen 31 of the shaker 32 which can be of any desired construction, this shaker having an inclined extension 33 at the front end of its screen 31 and which extension laps the lower portion of an apron 34 extending downwardly below the concave 3.

A fan casing 35 has a discharge spout 36 for directing an air blast upwardly through the screen 31 and in the general direction of the platform 25, there being a shaft 37 journaled within the casing 35 and carrying a blower 38.

The mechanism herein described can be actuated in any suitable manner and the various shafts are coupled preferably as illustrated in Fig. 4. The shaft 4' of the threshing cylinder 4 has a pulley 39 which transmits motion through a belt 40 to a pulley 41 on the shaft 37. Another pulley 42 is secured to the shaft 4' and is connected by a belt 43 to a large pulley 44 on the shaft 18. Another pulley 45 is secured to the shaft 18 and is connected by a belt 46 to a pulley 47 on shaft 16. A third pulley 48 is connected to the shaft 18 and engages a belt 49 which operates to drive a pulley 50 secured to the shaft 26.

For the purpose of adjusting the endless conveyer 29 so that a portion of the lower flight thereof will be substantially parallel with the cleaning screen 31, slots 51 are formed in the walls of the structure 1 and adjustably mounted therein is a transverse shaft 52 carrying a roll 53 which constitutes an idler and can be adjusted upwardly and downwardly to vary the angle of the lower flight of the conveyer 29.

The material to be threshed is supplied to the cylinder 4 and concave 3 from the hopper 2. From this concave said material is directed onto the screen 13 where it is engaged by the depending teeth 22 of the lower flight and dragged upwardly along the screen 13 and over the inclined fingers 15. Any coarse particles which cannot pass through the screen 13 will here fall into the gutter 14 and be subjected to the beating action of the arms 17, the grain falling through the apertures in the gutter 14 while the straw, etc., which cannot pass through said apertures will be thrown upwardly and outwardly and again engaged by the teeth 22 and dragged over the upper portion of the screen 13, after which all of the straw will be discharged at the upper end of the screen and taken care of by a pneumatic stacker or any other suitable means provided. Material discharged through the screen 13 and gutter 14 will drop onto the platform or table 25 and be conveyed forwardly to the extension 33 and thence rearwardly along the cleaning screen 31. As the movement of the conveyer 29 is very slow, the material when directed onto the screen 31 will be moved very slowly therealong so that ample time will be given to effect a thorough separation of material by this screen which moves with the shaker 32, the parts being actuated by any well known means. As this means constitutes no part of the present invention it is not deemed necessary to illustrate or describe it in the present case. The air blast will direct the very light particles such as chaff upwardly and outwardly from the machine. The use of the conveyer 29 to drag material over the cleaning screen 31 is particularly advantageous when threshing wet grain or wet peanuts when considerable difficulty is experienced usually in getting the chaff and sticks, etc., off of the screen. By utilizing a portion of the lower flight of the conveyer 29 as a dragging means, it serves to keep the cleaning screen clean so that the machine will not become choked under these conditions.

If desired, instead of utilizing an ordinary beater in the gutter 14, said gutter can be provided with threshing teeth 54 as shown in Fig. 3, these teeth coöperating with the arms 55 on shaft 16' so that a supplemental threshing action will take place upon the material directed into the gutter 14'.

What is claimed is:—

1. In a grain separator, the combination with a threshing cylinder and concave, of an inclined screen for receiving material from the concave, a screen gutter intersecting the screen between the ends thereof, means for conveying material longitudinally along the screen, means for guiding portions of the material over the gutter, and means within the gutter for beating the material directed thereinto.

2. In a separator, the combination with a screen for receiving material from threshing mechanism, and means for conveying material longitudinally along the screen, of a screen gutter intersecting the screen between the ends thereof, a beater within the gutter, and means for guiding portions of the material over the gutter.

3. In a separator, the combination with a screen for receiving material from threshing mechanism, and means for conveying material longitudinally along the screen, of a gutter intersecting the screen between the ends thereof, a beater within the gutter, and means for guiding portions of the material over the gutter, said means including spaced inclined fingers bridging the gutter.

4. In a separator, the combination with a screen for receiving material from threshing mechanism, and means for conveying material longitudinally along the screen, of a gutter intersecting the screen between the ends thereof, a beater within the gutter, and means for guiding portions of the material over the gutter, said means including spaced inclined fingers bridging the gutter, there being a clearance between said fingers and the wall of the gutter to permit the discharge of straw from the gutter and onto the screen.

5. In a separator, the combination with a screen for receiving material from threshing mechanism, and means for conveying material longitudinally along the screen, of a gutter intersecting the screen between the ends thereof, a beater within the gutter, means for guiding portions of the material over the gutter, said means including spaced inclined fingers bridging the gutter, and there being teeth upon the conveying means and working between the fingers.

6. The combination with a cleaning screen, an inclined table thereabove, and means for dragging material along the table to the screen and longitudinally of the screen, of an inclined screen above the table, threshing mechanism for directing material onto said inclined screen, means for directing material along the screen, and means between the ends of the screen for beating material directed along the screen, said means including a screen gutter depending from the screen, and a revoluble element within the gutter.

7. The combination with a cleaning screen, an inclined table thereabove, and means for dragging material along the table to the screen and longitudinally of the screen, of an inclined screen above the table, threshing mechanism for directing material onto said inclined screen, means for directing material along the screen, and means between the ends of the screen for beating material directed along the screen, said means including a gutter depending from the screen, a revoluble element within the gutter, and spaced fingers bridging the gutter.

8. In a grain separator, the combination with a concave and threshing cylinder, an inclined screen, and means for dragging material along the screen and away from the concave, of an angularly adjustable grate section constituting an extension of the concave, a screen hingedly connected to said section and extending under the inclined screen, and means for maintaining the hinged screen in position to direct material to the inclined screen from the grate when the grate is in any one of its positions.

9. In a grain separator, the combination with a concave and threshing cylinder, an inclined screen, and means for dragging material along the screen and away from the concave, of an angularly adjustable grate section constituting an extension of the concave, a screen hingedly connected to said section and extending under the inclined screen, and supplemental separating means between the ends of the inclined screen and including a depending transverse screen gutter, and a revoluble element within the gutter.

In testimony that I claim the foregoing as my own, I have hereto affixed my signature in the presence of two witnesses.

DON A. RADLE.

Witnesses:
HENRY C. MORSE,
H. B. GARRETT.

Copies of this patent may be obtained for five cents each, by addressing the "Commissioner of Patents, Washington, D. C."